US006421596B2

(12) United States Patent
Lee

(10) Patent No.: US 6,421,596 B2
(45) Date of Patent: Jul. 16, 2002

(54) SHIFT CONTROL METHOD FOR AUTOMATIC TRANSMISSION

(75) Inventor: Hee-Yong Lee, Suwon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/730,861

(22) Filed: Dec. 7, 2000

(30) Foreign Application Priority Data

Dec. 10, 1999 (KR) ............................................. 99-56526

(51) Int. Cl.[7] ................................................. G06F 7/00
(52) U.S. Cl. ............................. 701/51; 701/55; 701/56; 477/97; 477/120
(58) Field of Search ............................. 701/55, 56, 66, 701/51, 65, 59; 477/97, 129, 78, 34, 120

(56) References Cited

U.S. PATENT DOCUMENTS

| 5,231,582 A | * | 7/1993 | Takahashi et al. ............. 701/56 |
| 5,247,859 A | * | 9/1993 | Agusa et al. .................. 74/866 |
| 6,070,118 A | * | 5/2000 | Ohta et al. ..................... 701/65 |
| 6,106,434 A | * | 8/2000 | Ibamoto et al. ............. 477/120 |
| 6,182,000 B1 | * | 1/2001 | Ohta et al. ..................... 701/55 |

\* cited by examiner

*Primary Examiner*—William A. Cuchlinski, Jr.
*Assistant Examiner*—Marthe Marc-Coleman
(74) *Attorney, Agent, or Firm*—Birch, Stewart, Kolasch & Birch, LLP

(57) ABSTRACT

In a shift control method for an automatic transmission, it is first determined if a vehicle is running on a level road according to a signal from a drive state detector, then one of an economy or a power mode is selected according to a current throttle opening ratio. After, an upshifting point of the selected mode is set, a speed ratio is set according to the upshifting point of the selected mode and outputting a corresponding control signal to a drive unit.

11 Claims, 6 Drawing Sheets

SHIFT CONTROL METHOD FOR AUTOMATIC TRANSMISSION

BACKGROUND OF THE INVENTION (a) Field of the Invention

The present invention relates to an automatic transmission for vehicles, and more particularly, to a shift control method for an automatic transmission.

(b) Description of the Related Art

In automatic transmissions used for vehicles, a shift control system performs control to realize automatic shifting into different speeds and shift ranges according to various factors including throttle opening, vehicle speed and load, and several engine and driving conditions detected through a plurality of sensors. That is, based on such factors, the shift control system controls a plurality of solenoid valves of a hydraulic control system such that hydraulic flow in the hydraulic control system is controlled, resulting in the shifting of the transmission into various speeds and shift ranges.

In more detail, when the driver manipulates a shift lever to a particular shift range, a manual valve of the hydraulic control system undergoes port conversion as a result of the manual valve being indexed with the shift lever. By this operation, hydraulic pressure supplied from a hydraulic pump selectively engages a plurality of friction elements of a gearshift mechanism according to the duty control of the solenoid valves, thereby realizing shifting into the desired shift range.

When designing such an automatic transmission, power performance is considered to be important in a load range higher than a medium engine load, while fuel consumption ratio is considered to be important in a load range lower than the medium engine load. The medium engine load is set on the basis of 50% of a throttle opening.

That is, the automatic transmission has an economy mode and a power mode. In the economy mode, a shift pattern is designed such that an upshifting operation is quickly realized to improve the fuel consumption ratio. In a power mode, a shift pattern is designed such that an upshifting point is moved to a high speed side so that engine torque can be increased.

The economy and power modes are selected by a user manipulating a pattern select switch.

However, since such shift patterns are fixed in a memory, it is impossible to set an optimum shifting point according to variations in engine torque, torque converter state, and running resistance. That is, the shift patterns cannot be flexibly varied according to these variations.

SUMMARY OF THE INVENTION

The present invention has been made in an effort to solve the above problems.

It is an objective of the present invention to provide a shift control method for an automatic transmission that detects a driver's desire and a vehicle's running condition and determines a shifting point which can realize optimum fuel consumption ratio and power performance.

To achieve the above objective, the present invention provides a shift control method for an automatic transmission comprising the steps of determining if a vehicle is running on a level road according to a signal from a drive state detector, selecting one of an economy or a power mode according to a current throttle opening ratio, setting an upshifting point of the selected mode, and determining a speed ratio according to the upshifting point of the selected mode and outputting a corresponding control signal to a drive unit.

The step of determining if a vehicle is running on a level road further comprises the steps of determining a gradient value according to a signal from the drive state detector, determining if the gradient value is in a preset standard gradient range, and determining that the vehicle runs on the level road when the gradient value is in the preset standard gradient range or runs on the slope when the gradient value is not in the preset standard gradient range.

Preferably, the preset standard gradient range is −3.5–5%.

The step of selecting one of an economy or a power mode further comprises the steps of detecting the current throttle opening ratio, determining if the detected throttle opening ratio is less than a predetermined standard throttle opening ratio, and selecting the economy mode when the detected throttle opening ratio is less than the predetermined standard throttle opening ratio and the power mode when the detected throttle opening ratio is not less than the predetermined standard throttle opening ratio.

Preferably, the standard throttle opening ratio is about 50%.

The method may further comprise the step of setting an upshifting point of a slope running mode when the vehicle runs on the slope, setting a speed ratio according to the upshifting point of the slope running mode and outputting a control signal to the drive unit after a speed ratio is set.

When setting the upshifting point of the slope running mode, a point where a driving force line of a current n-speed intersects a driving force line of an n+1 speed becomes the upshifting point.

When the upshifting point of the economy mode is set, a point where a fuel consumption line of a current "n" speed intersects a fuel consumption line of an "n+1" speed ratio becomes the upshifting point.

When upshifting point of the power mode is set, a point where a torque line of a current "n" speed ratio intersects a torque line of an "n+1" speed ratio becomes the upshifting point.

The speed ratio is determined according to the following equation:

$$No = No\_Economy + (No\_Power - No\_Economy) \times SUM(PFC)$$

where No is a speed ratio;

No_Economy is a current speed ratio in an economy mode shifting pattern;

No_Power is a current speed ratio in a power mode shifting pattern; and

SUM(PFC) is the sum of power factor counters.

The SUM(PFC) satisfies the following condition:

$$0 < SUM(PFT) < 1$$

When a shift control level is in one of neutral N, park P, and reverse R ranges, the SUM(PFC) is set at "0."

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
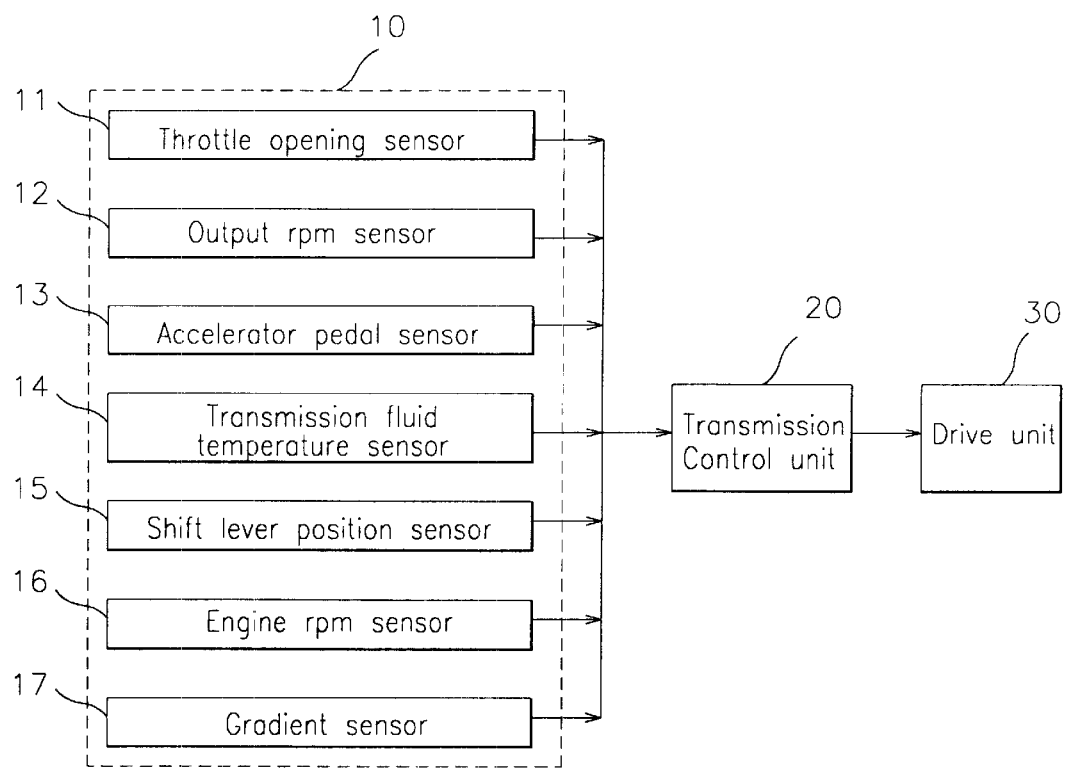
FIG. 1 is a block diagram of a shift control system associated with a shift control method according to a preferred embodiment of the present invention.

FIG. 1 shows a block diagram of a shift control system and related elements to which the present invention is applied.

The shift control system includes a drive state detector 10, a transmission control unit 20, and a drive unit 30. The drive state detector 10 detects overall driving conditions of the vehicle. The drive state detector 10 includes a throttle opening sensor 11, an output rpm sensor 12, an accelerator pedal sensor 13, a transmission fluid temperature sensor 14, a shift lever position sensor 15, an engine rpm sensor 16, and a gradient sensor 17. The elements of the drive state detector 10 output signals to the transmission control unit 20 that controls the operation of the drive unit 30 according to the transmitted signals.

A shift control method according to the present invention will now be described with reference to FIGS. 2 through 7.

Figure 2:
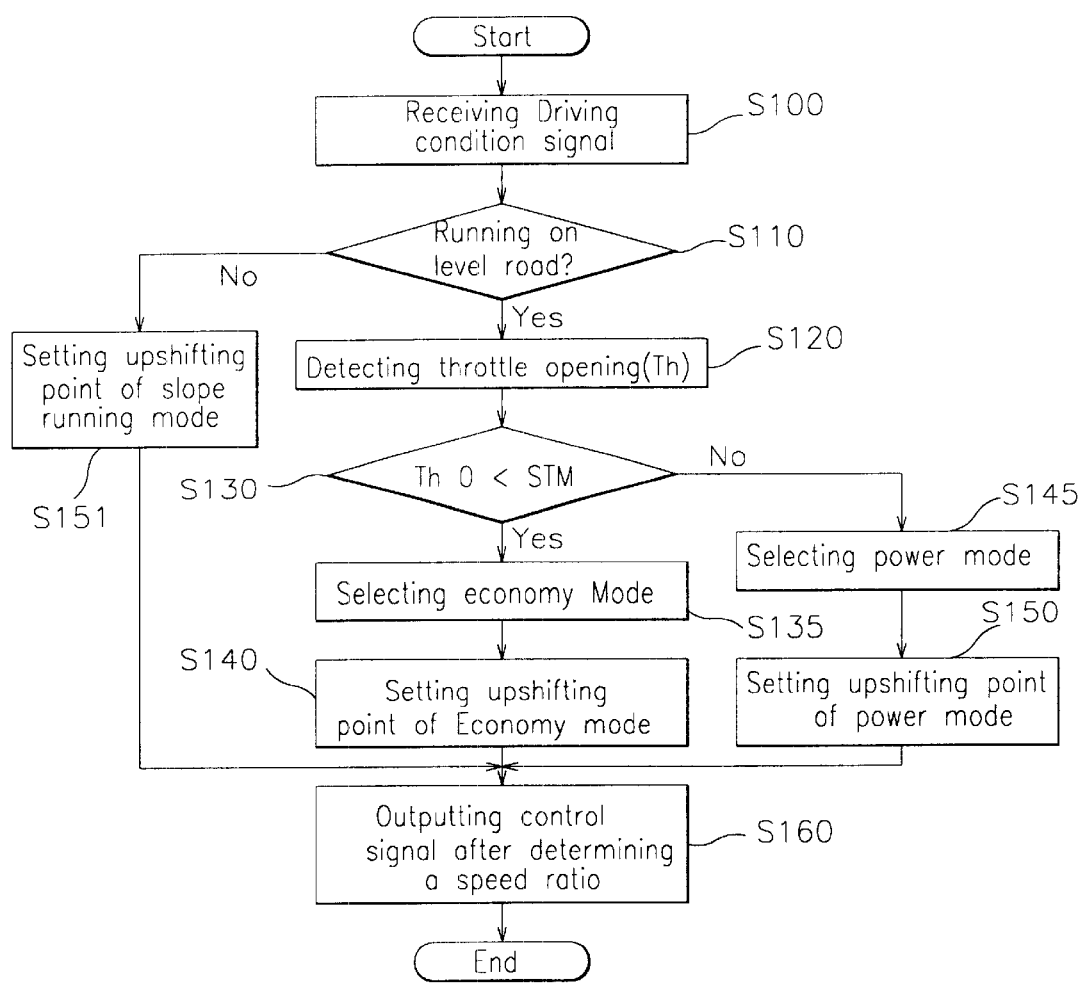
FIG. 2 is a flow chart of a shift control method for an automatic transmission according to a preferred embodiment of the present invention.

FIG. 2 is a flow chart of a shift control method for an automatic transmission according to a preferred embodiment of the present invention.

First, the transmission control unit 20, which controls the transmission according to a pre-installed program, receives drive state signals from the drive state detector 10 (S100). Then, the transmission control unit 20 determines if the vehicle is running on a level road (S110). That is, the transmission control unit 20 determines a current gradient value according to a signal from the gradient sensor 17, and determines if the current gradient value is within a preset standard gradient value range of about −3.5–5%. When the current gradient value is within the preset standard gradient value range, the transmission control unit 20 determines that the vehicle is running on a level road.

When it is determined that the vehicle is running on a slope, the transmission control unit sets an upshifting point of a slope running mode (S151). Generally, a power mode is set as the slope running mode. When setting the upshifting point of the slope running mode, a point where a driving force line of a current "n" speed ratio intersects a driving force line of an "n+1" speed ratio becomes the upshifting point, provided that the throttle opening is not varied.

However, when it is determined that the vehicle is running on a level road, the transmission control unit 20 detects a throttle opening ratio Th according to a signal from the throttle opening sensor 11 (S120).

Then, the transmission control unit 20 determines if the detected throttle opening ratio Th is less than a predetermined standard ratio STh (for example, 50%) (S130).

Figure 3A:
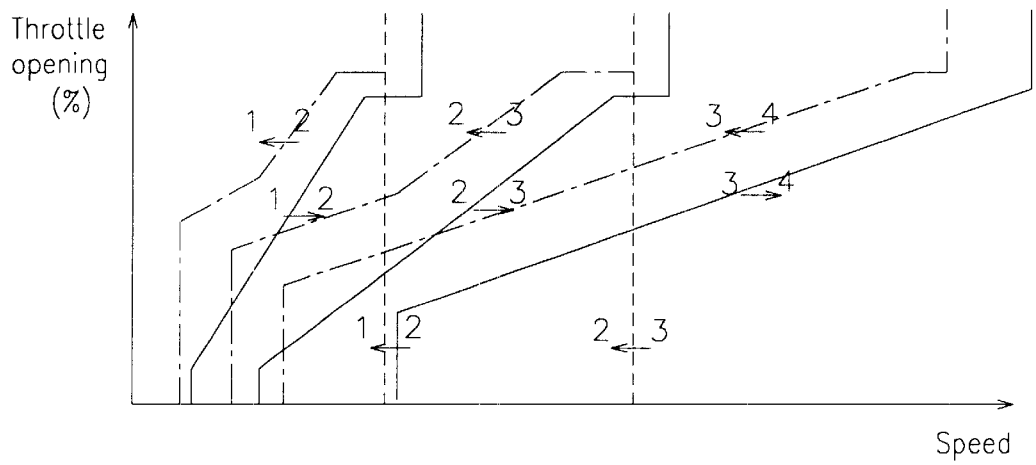
FIG. 3a is a graph illustrating upshifting setting points in an economy mode according to a throttle opening with respect to a vehicle speed.
Figure 3B:
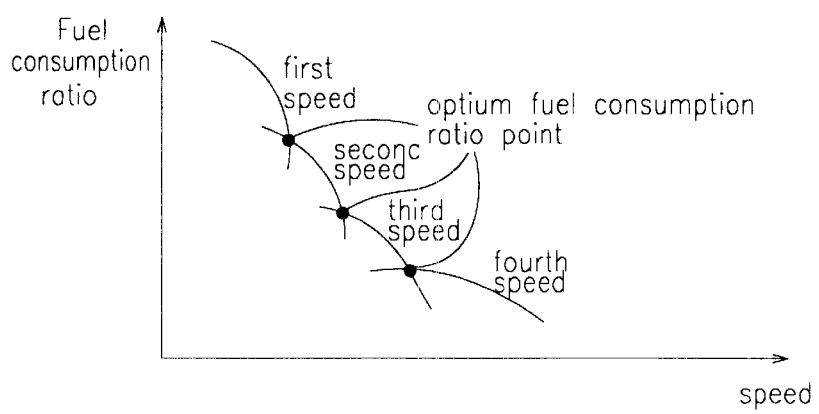
FIG. 3b is a graph illustrating up/downshifting patterns in an economy mode according to a fuel consumption ratio with respect to a vehicle speed.

When the detected throttle opening ratio is less than the predetermined standard ratio, the transmission control unit 20 selects an economy mode having a shift pattern as shown in FIG. 3a (S135), after which an economy mode upshifting point is set according to an up/downshifting pattern set according to a fuel consumption ratio with respect to a vehicle speed as shown in FIG. 3b (S140). Then, the transmission control unit 20 determines a speed ratio according to the economy mode upshifting point and outputs a corresponding signal to the drive unit 30 (S160).

Figure 4A:
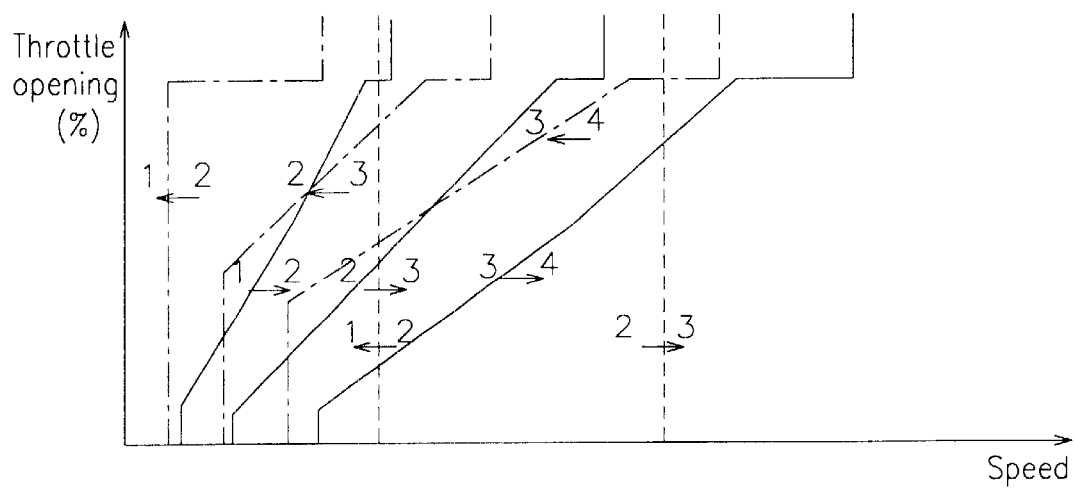
FIG. 4a is a graph illustrating upshifting setting points in a power mode according to a throttle opening with respect to a vehicle speed.
Figure 4B:
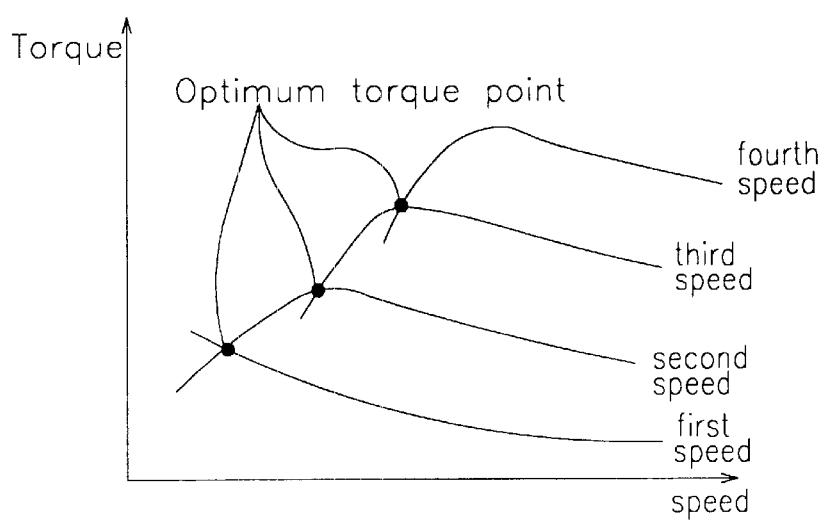
FIG. 4b is a graph illustrating up/downshifting patterns in a power mode according to a fuel consumption ratio with respect to a vehicle speed.

In Step 130, when the detected throttle opening ratio is higher than the predetermined standard ratio, the transmission control unit 20 selects a power mode having a shift pattern as shown in FIG. 4a (S145), after which a power mode upshifting point is set according to an up/downshifting pattern set according to a fuel consumption ratio with respect to a vehicle speed as shown in FIG. 4b (S150). Then, the transmission control unit (20) determines a speed ratio according to the power mode upshifting point and outputs a corresponding signal to the drive unit 30 (S160).

When the economy mode upshifting point is set, a point where a fuel consumption line of a current "n" speed ratio intersects a fuel consumption line of an "n+1" speed ratio becomes the upshifting point, provided that the throttle opening is not varied.

When the power mode upshifting point is set, a point where a torque line of a current "n" speed ratio intersects a torque line of an "n+1" speed ratio becomes the power mode upshifting point.

In addition, when determining the speed ratio, the throttle opening Th detected by the throttle opening sensor 10 is differentiated. When the differentiated value dTh of the throttle opening is higher than a predetermined value (i.e., 1.25V) and is maintained for a predetermined duration (i.e., 16 ms), the transmission control unit 20 increases the power factor counter by 0.1. However, when the differentiated value dTh of the throttle opening is lower than a predetermined value (i.e., 1.25V) and is maintained for a predetermined duration (i.e., 16 ms), the transmission control unit 20 decreases the power factor counter by 0.1.

After the above, the transmission control unit 20 calculates a sum of the increased and decreased power factor counters, and a speed ratio can be obtained using the sum according to the following equation 1:

$$No = No\_Economy + (No\_Power - No\_Economy) \times SUM(PFC) \qquad \text{[Equation 1]}$$

where No is a speed ratio;

No_Economy is a current speed ratio in an economy mode shifting pattern;

No_Power is a current speed ratio in a power mode shifting pattern; and

SUM(PFC) is the sum of the power factor counters.

In the above, the SUM(PFC) should satisfy the following condition:

$$0 < SUM(PFT) < 1$$

When a shift control level is in one of neutral N, park P, and reverse R ranges, the SUM(PFC) is set at "0."

In addition, when establishing the upshifting point in the power mode, a point where a fuel consumption line of a current "n" speed ratio intersects a fuel consumption line of an "n+1" speed ratio becomes the upshifting point, provided that the throttle opening is not varied.

In addition, when determining the speed ratio, the throttle opening Th detected by the throttle opening sensor 10 is differentiated. When the differentiated value dTh of the throttle opening is higher than a predetermined value (i.e., 1.25V) and is maintained for a predetermined duration (i.e., 16 ms), the transmission control unit 20 increases the power factor counter by 0.1. However, when the differentiated value dTh of the throttle opening is lower than a predetermined value (i.e., 1.25V) and is maintained for a predetermined duration (i.e., 16 ms), the transmission control unit 20 decreases the power factor counter by 0.1.

After the above, the transmission control unit 20 calculates a sum of the increased and decreased power factor counters, and a speed ratio can be obtained using the sum according to the above equation 1.

Figure 5:
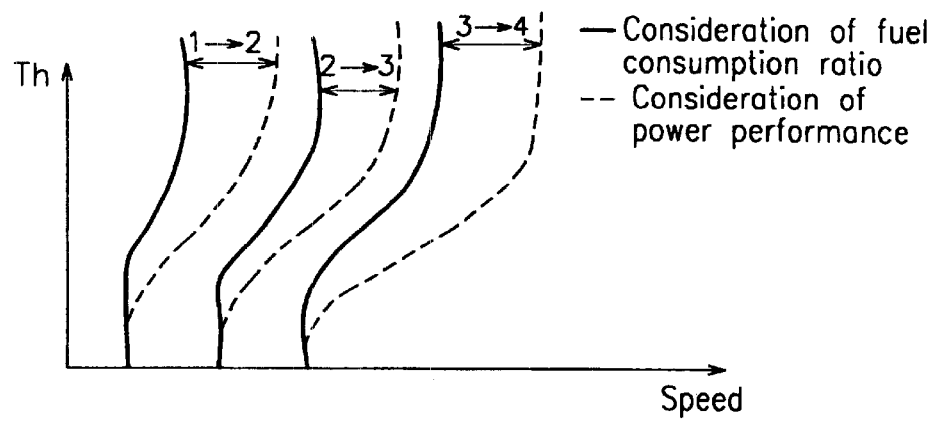
FIG. 5 is a graph illustrating dual shifting patterns of an automatic transmission of the present invention.
Figure 6:
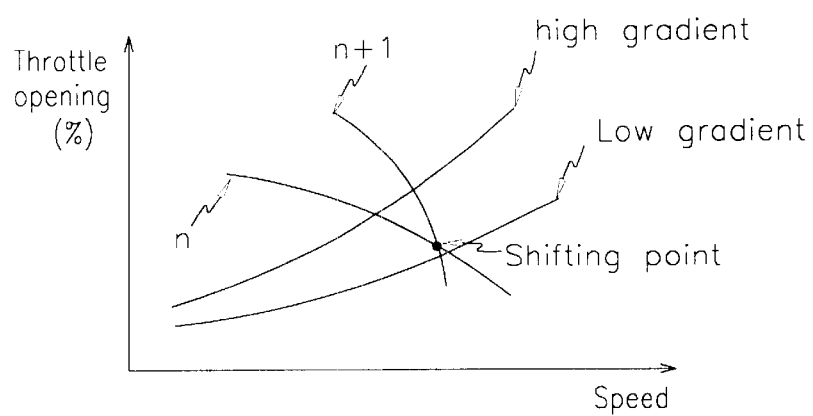
FIG. 6 is a graph illustrating downshifting setting points of an automatic transmission of the present invention.
Figure 7:
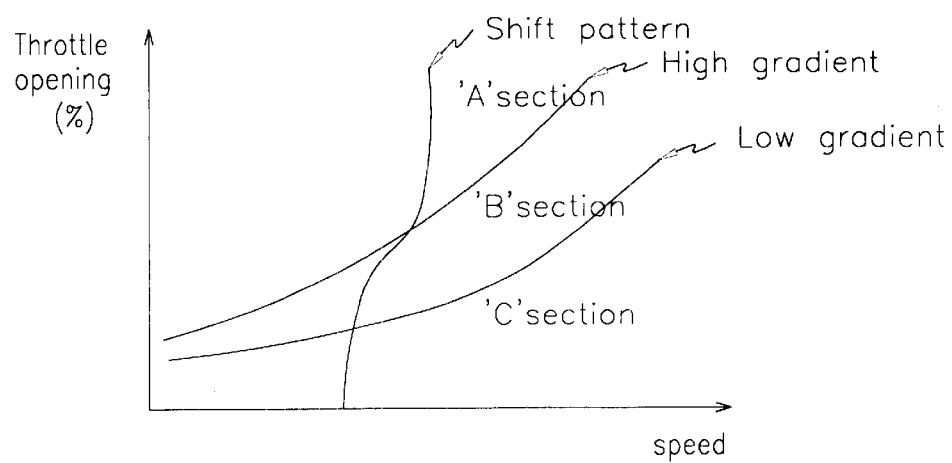
FIG. 7 is a graph illustrating a range in which a downshifting is allowable in an automatic transmission of the present invention.

As described above, the transmission control unit 20 provides a dual-shifting pattern as shown in FIG. 5.

When power-on downshifting occurs during a drive on a level road, the transmission control unit 20 establishes a downshifting line considering hysteresis so that the shifting operation does not frequently occur on the basis of the established upshifting point.

In the above, the driving resistance can be obtained according to the following equation 2;

$$R_L = [\mu_r \times W] + [0.5 \times C_d \times \rho \times A \times V^2] + [(W+\Delta W) \times A/g] + [W \times \sin\theta] \quad \text{[Equation 2]}$$

where $[\mu_r \times W]$ is a rolling resistance;

$[0.5 \times C_d \times \rho \times A \times V^2]$ is an air resistance;

$[(W+\Delta W) \times A/g]$ is an acceleration resistance; and $[W \times \sin\theta]$ is a slope-driving resistance.

In addition, driving force $F_w$ is calculated according to the following equation 3.

$$F_w = (T_e \times i_s \times i_f \times \eta)/r \quad \text{[Equation 3]}$$

where $T_e$ is an engine torque(kgf·m);

$i_s$ is a step gear ratio;

$i_f$ is a final gear ratio;

$\eta$ is a power train transmission efficiency; and r is a motion radius of a tire.

Margin driving force F can be obtained according to the following equation 4.

$$F = F_w - R_L \quad \text{[Equation 4]}$$

A current speed ratio Fn and upper and lower speed ratios Fn+1 and Fn−1 can be calculated according to equation 4.

Accordingly, when assuming that the current speed ratio Fn is calculated according to equation 4 and the upper and lower speed ratios Fn=1 and Fn−1 are the same as the current speed ratio as a running resistance before and after the shifting is performed, an engine torque Te is assumed by calculating the engine RPM.

That is, the engine torque Te is calculating according to the following equation 5.

$$Te = TQI \times TQ\_STND \quad \text{[Equation 5]}$$

where TQI is an engine torque information (%); and

TQ_STND is a standard value of the engine torque information (N×m)

In the above, the shift ratio is increased by one stage when the established slope running upshifting point is in a low running resistance region so that the shifting is realized in regions "A" and "B." In addition, when the established slope running upshifting point is in a high running resistance region, the shifting is realized in the region "A" to maintain the current shift ratio.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A shift control method for an automatic transmission comprising the steps of:
    determining if a vehicle is running on a level road according to a signal from a drive state detector which further comprises the steps of determining a gradient value according to said signal from the drive state detector, determining if the gradient value is in a preset standard gradient range, and determining that the vehicle runs on the level road when the gradient value is in the preset standard gradient range or runs on the slope when the gradient value is not in the preset standard gradient range;
    selecting one of an economy or a power mode according to a current throttle opening ratio;
    setting an upshifting point of the selected mode; and
    determining a speed ratio according to the upshifting point of the selected mode and outputting a corresponding control signal to a drive unit.

2. The method of claim 1 wherein the preset standard gradient range is −3.5–5%.

3. The method of claim 1 further comprising the step of setting an upshifting point of a slope running mode when the vehicle runs on the slope, setting a speed ratio according to the upshifting point of the slope running mode and outputting a control signal to the drive unit after a speed ratio is set.

4. The method of claim 3 wherein when setting the upshifting point of the slope running mode, a point where a driving force line of a current n-speed intersects a driving force line of an n+1 speed becomes the upshifting point.

5. A shift control method for an automatic transmission comprising the steps of:
    determining if a vehicle is running on a level road according to a signal from a drive state detector which further comprises the steps of detecting the current throttle opening ratio, determining if the detected throttle opening ratio is less than a predetermined standard throttle opening ratio, and selecting the economy mode when the detected throttle opening ratio is less than the predetermined standard throttle opening ratio and the power mode when the detected throttle opening ratio is not less than the predetermined standard throttle opening ratio;
    selecting one of an economy or a power mode according to a current throttle opening ratio;
    setting an upshifting point of the selected mode; and
    determining a speed ratio according to the upshifting point of the selected mode and outputting a corresponding control signal to a drive unit.

6. The method of claim 5 wherein the standard throttle opening ratio is about 50%.

7. The method of claim 5 wherein when the upshifting point of the economy mode is set, a point where a fuel consumption line of a current "n" speed intersects a fuel consumption line of an "n+1" speed ratio becomes the upshifting point.

8. The method of claim 5 wherein when the upshifting point of the power mode is set, a point where a torque line of a current "n" speed ratio intersects a torque line of an "n+1" speed ratio becomes the upshifting point.

9. The method of claim 5 wherein the speed ratio is determined according to the following equation:

$$No = No\_Economy + (No\_Power - No\_Economy) \times SUM(PFC)$$

where No is a speed ratio;
- No_Economy is a current speed ratio in an economy mode shifting pattern;
- No_Power is a current speed ratio in a power mode shifting pattern; and
- SUM(PFC) is the sum of power factor counters.

10. The method of claim 9 wherein the SUM(PFC) satisfies the following condition:

$$0 < SUM(PFT) < 1.$$

11. The method of claim 10 wherein when a shift control level is in one of neutral N, park P, and reverse R ranges, the SUM(PFC) is set at "0."

* * * * *